United States Patent
Gorny et al.

(10) Patent No.: US 12,278,930 B2
(45) Date of Patent: *Apr. 15, 2025

(54) SYSTEM AND METHOD OF REAL-TIME WIKI KNOWLEDGE RESOURCES

(71) Applicant: Nextiva, Inc., Scottsdale, AZ (US)

(72) Inventors: Tomas Gorny, Scottsdale, AZ (US); Dallas Barabasz-Lynn, Gilbert, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 284 days.

This patent is subject to a terminal disclaimer.

(21) Appl. No.: 17/665,978

(22) Filed: Feb. 7, 2022

(65) Prior Publication Data
US 2022/0159124 A1 May 19, 2022

Related U.S. Application Data

(63) Continuation of application No. 16/940,097, filed on Jul. 27, 2020, now Pat. No. 11,258,906, which is a
(Continued)

(51) Int. Cl.
*H04M 3/523* (2006.01)
*G06Q 30/016* (2023.01)
(Continued)

(52) U.S. Cl.
CPC ........ *H04M 3/5233* (2013.01); *G06Q 30/016* (2013.01); *G06Q 30/02* (2013.01);
(Continued)

(58) Field of Classification Search
CPC ............. H04M 3/5233; H04M 3/5166; H04M 3/5175; H04M 3/5191; H04M 3/5237;
(Continued)

(56) References Cited

U.S. PATENT DOCUMENTS 5,825,869 A * 10/1998 Brooks ............... H04M 3/5233
379/265.12
6,430,558 B1 8/2002 Delano
(Continued)

FOREIGN PATENT DOCUMENTS

WO 2012142341 10/2012

OTHER PUBLICATIONS

EP Examination Report; EP Application No. 19900260; Jan. 30, 2023; 14 pages.
(Continued)

*Primary Examiner* — Phung-Hoang J Nguyen
(74) *Attorney, Agent, or Firm* — Spencer Fane LLP; Steven J. Laureanti

(57) ABSTRACT

A system and method are disclosed for recommending a resource to a customer service representative that includes one or more databases that store data describing electronic communication between one or more customer system communication devices and one or more service center communication devices. Embodiments further include a computer coupled with one or more databases and configured to monitor communication activity to determine whether a customer service ticket has been opened between one or more customer system communication devices and one or more service center communication devices and determine a customer service representative score based on one or more customer service representative ranking factors.

17 Claims, 6 Drawing Sheets

Related U.S. Application Data continuation of application No. 16/591,326, filed on Oct. 2, 2019, now Pat. No. 10,764,440.

(60) Provisional application No. 62/783,353, filed on Dec. 21, 2018.

(51) Int. Cl.
 *G06Q 30/02* (2023.01)
 *H04M 3/51* (2006.01)

(52) U.S. Cl.
 CPC ....... *H04M 3/5166* (2013.01); *H04M 3/5175* (2013.01); *H04M 3/5191* (2013.01); *H04M 3/5237* (2013.01)

(58) Field of Classification Search
 CPC .......... H04M 2203/403; G06Q 30/016; G06Q 30/02
 See application file for complete search history.

(56) References Cited

U.S. PATENT DOCUMENTS

| | | | |
|---|---|---|---|
| 6,459,788 B1 | 10/2002 | Khuc et al. | |
| 6,859,783 B2 | 2/2005 | Cogger et al. | |
| 7,885,913 B2 | 2/2011 | Weber et al. | |
| 8,027,458 B1 | 9/2011 | Pollock | |
| 8,065,173 B2 | 11/2011 | Abu-Hakima et al. | |
| 8,184,797 B1 | 5/2012 | Rosen | |
| 8,300,797 B1 | 10/2012 | Benesh et al. | |
| 8,311,863 B1 | 11/2012 | Kemp | |
| 8,341,081 B1 | 12/2012 | Wang et al. | |
| 8,724,797 B2 | 5/2014 | Chishti et al. | |
| 8,781,882 B1 | 7/2014 | Arboletti et al. | |
| 8,789,053 B2 | 7/2014 | Howard | |
| 8,880,430 B1 | 11/2014 | Wang et al. | |
| 9,075,802 B2 | 7/2015 | Davis et al. | |
| 9,215,323 B2 | 12/2015 | Chishti | |
| 9,253,320 B2 | 2/2016 | Fan et al. | |
| 10,084,919 B2 | 9/2018 | Dervan et al. | |
| 10,223,646 B1 | 3/2019 | Vontobel et al. | |
| 10,614,468 B2 | 4/2020 | Vedula | |
| 10,764,440 B2 | 9/2020 | Gomy et al. | |
| 10,805,465 B1* | 10/2020 | Krebs | G06F 40/279 |
| 10,810,600 B2 | 10/2020 | Adrian et al. | |
| 10,861,110 B2 | 12/2020 | Chen et al. | |
| 10,970,291 B2 | 4/2021 | McNeela et al. | |
| 11,023,774 B2 | 6/2021 | Nefedov | |
| 2002/0123983 A1* | 9/2002 | Riley | G06Q 10/00 |
| 2002/0188527 A1 | 12/2002 | Dillard et al. | |
| 2003/0220860 A1 | 11/2003 | Heytens et al. | |
| 2004/0042611 A1 | 3/2004 | Power et al. | |
| 2009/0043669 A1 | 2/2009 | Hibbets et al. | |
| 2010/0020961 A1 | 1/2010 | Spottiswoode | |
| 2012/0051536 A1* | 3/2012 | Chishti | H04M 3/5175 379/265.06 |
| 2012/0224680 A1* | 9/2012 | Spottiswoode | H04M 3/5232 379/265.11 |
| 2013/0039483 A1* | 2/2013 | Wolfeld | H04M 3/00 379/265.03 |
| 2013/0173521 A1 | 7/2013 | Pirlet et al. | |
| 2014/0278646 A1* | 9/2014 | Adrian | G06Q 10/063114 705/7.15 |
| 2015/0269586 A1 | 9/2015 | Garia et al. | |
| 2016/0269554 A1* | 9/2016 | Cecchi | G06F 40/30 |
| 2016/0292802 A1 | 10/2016 | Tada et al. | |
| 2020/0034689 A1 | 1/2020 | Andrassy et al. | |
| 2020/0097608 A1 | 3/2020 | Xiu et al. | |
| 2020/0358902 A1 | 11/2020 | Gomy et al. | |

OTHER PUBLICATIONS

Anonymous: "Manual:Creating a bot—MediaWiki", Jul. 28, 2018 (Jul. 28, 2018), XP093017147, Retrieved from the Internet: URL: https://mediawiki.org/w/index.php?title=Manual:Creating_a_bot &oldid=2839131 [retrieved on Jan. 24, 2023], 9 pages.
International Search Report for Application No. PCT/US19/62667 dated Feb. 7, 2020. 3 Page.

* cited by examiner

SYSTEM AND METHOD OF REAL-TIME WIKI KNOWLEDGE RESOURCES

CROSS-REFERENCE TO RELATED APPLICATIONS

This application is a continuation of U.S. patent Ser. No. 16/940,097, filed on Jul. 27, 2020, entitled "System and Method of Real-Time Wild Knowledge Resources," which is a continuation of U.S. application Ser. No. 16/591,326, filed on Oct. 2, 2019, entitled "System and Method of Real-Time Wild Knowledge Resources," now U.S. Pat. No. 10,764,440, which claims the benefit under 35 U.S.C. § 119(e) to U.S. Provisional Application No. 62/783,353, filed Dec. 21, 2018, and entitled "System and Method of Real-Time Wild Knowledge Resources." U.S. patent application Ser. No. 16/940,097, U.S. Pat. No. 10,764,440, and U.S. Provisional Application No. 62/783,353 are assigned to the assignee of the present application.

TECHNICAL FIELD

The present disclosure relates generally to customer resource management and specifically to a system and method of recommending a knowledge resource to a customer service representative.

BACKGROUND

In a customer service center, some agents resolve customer issues more quickly and with higher satisfaction than others. In some cases, the agent may simply be more skilled and knowledgeable in one type of customer issue than he or she is in others. However, simply assigning a customer to the agent who is most skilled and knowledgeable at handling their customer issue results in the agents with the highest skills and knowledge on a particular issue are assigned all customers who are experiencing that issue, while the agents who are less skilled and knowledgeable are assigned no customers at all. What is needed is a way to make the skills and knowledge of the most proficient agents available for all agents in a manner that increases efficiency and customer satisfaction. The inability to make the skills and knowledge of proficient agents available to all agents is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
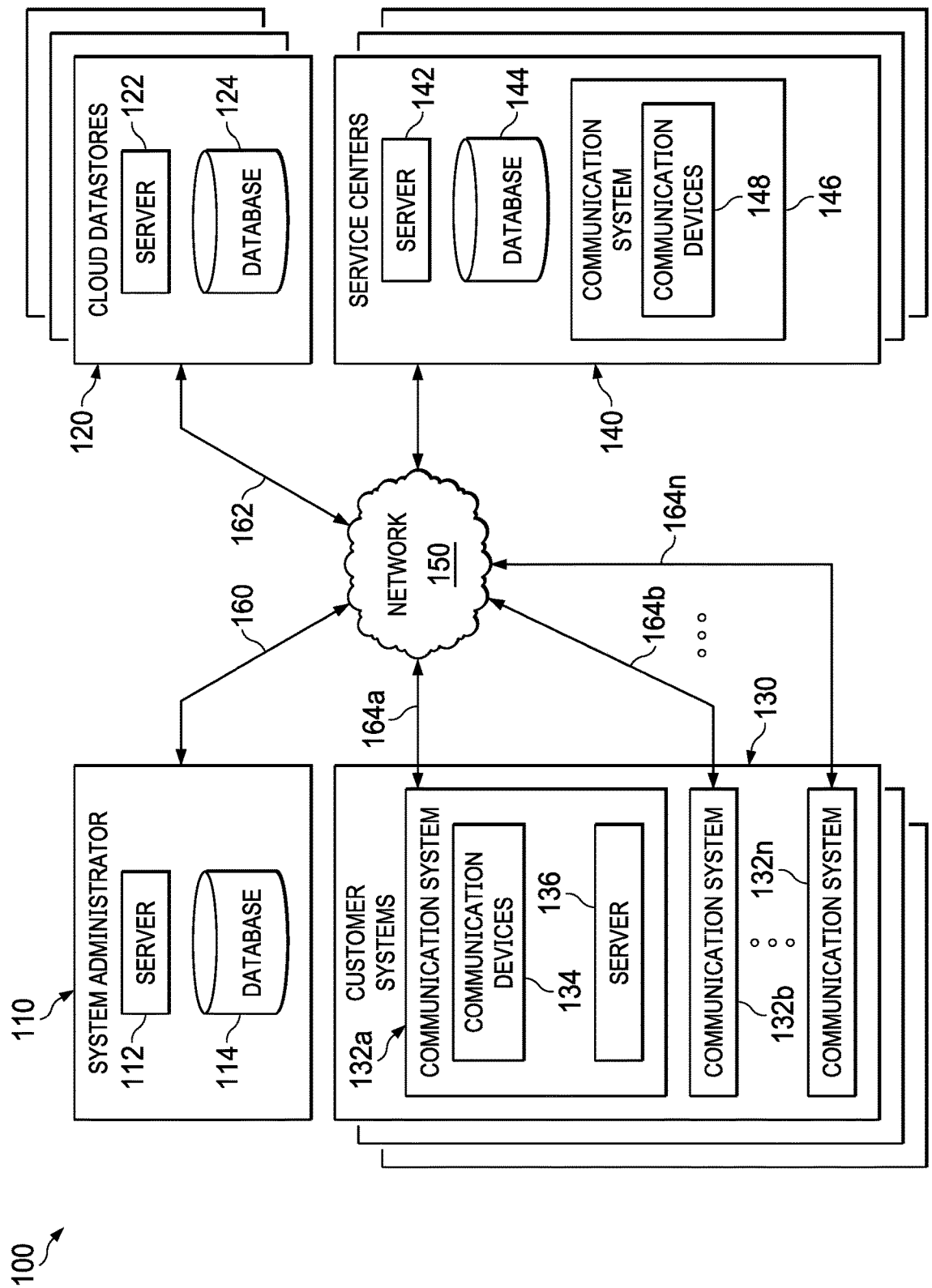
FIG. 1 illustrates an exemplary knowledge system, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in more detail herein, embodiments of the systems and methods described in the following disclosure comprise monitoring communication activities relating to resolving customer issues and providing knowledge resources updated according to the current best solutions to resolving the customer issues. In some embodiments, the knowledge resources are sorted by topics, and knowledge resources are automatically updated by analyzing resolved customer service tickets. For example, and as described in more detail below, when a resolved customer service ticket is closed, the customer service ticket (and related communication activity) is analyzed to determine topics associated with the customer service ticket and the quality of its resolution. Using the results of this analysis, the knowledge resources associated with the identified topic may be automatically updated and recommended to agents, such as, for example, one or more customer service representatives, for use in resolving future customer service tickets for the same topic.

FIG. 1 illustrates an exemplary knowledge system 100, according to a first embodiment. Knowledge system 100 comprises one or more system administrators 110, one or more cloud datastores 120, one or more customer systems 130, one or more service centers 140, network 150, and communication links 160-166. Although one or more system administrators 110, one or more cloud datastores 120, one or more customer systems 130, one or more service centers 140, a single network 150, and one or more communication links 160-166 are shown and described, embodiments contemplate any number of system administrators, service centers, customer systems, cloud datastores, networks, or communication links, according to particular needs.

In one embodiment, one or more system administrators 110 comprises server 112 and database 114. Server 112 is programmed to assign customer service tickets to customer service representatives of one or more service centers 140 by monitoring and analyzing communication activity, such as, for example, telephone calls, emails, instant chat, or text messaging between one or more customer systems 130 and one or more service centers 140. Server 112 comprises one or more servers at one or more locations, local to, or remote from, one or more system administrators 110. Database 114 comprises one or more databases or other data storage arrangements at one or more locations, local to, or remote from, one or more system administrators 110. In one embodiment, database 114 comprising one or more databases of one or more system administrators 110 is coupled with server 112 comprising one or more servers of one or more system administrators 110 using one or more local area networks (LANs), metropolitan area networks (MANs), wide area networks (WANs), network 150 (such as, for example, the Internet), or any other appropriate wire line, wireless, or any other one or more communication links 160-166. Database 114 stores data that is made available and may be used by server 112 according to the operation of knowledge system 100.

In another embodiment, one or more cloud datastores 120 comprises server 122 and database 124. One or more cloud datastores 120 provide for the storage of data and hosting of programs or applications. According to embodiments, server 122 of one or more cloud datastores 120 may host and run one or more runtime processes associated with system administrator 110. Server 122 comprises one or more servers configured to access, update, and provide data associated with one or more system administrators 110, one or more customer systems 130, and/or one or more service centers 140. Database 124 comprises one or more databases or other data storage arrangements at one or more locations, local to, or remote from, one or more cloud datastores 120. In one embodiment, database 124 representing one or more databases is coupled with server 122 representing one or more servers using one or more LANs, MANs, WANs, network 150 (such as, for example, the Internet), or any other appropriate wire line, wireless, or any other one or more communication links 160-166. Database 124 stores data that is made available and may be used by one or more customer systems 130, one or more service centers 140, according to the operation of knowledge system 100.

In one embodiment, one or more customer systems 130 are associated with one or more customers such as, for example, a buyer, customer, retailer, or other individual, business or enterprise which communicates with one or more service centers 140. One or more customer systems 130 comprise the one or more customer communication systems 132a-132n that send communications to, and receive communications from, one or more service centers 140. Customer communication system 132a-132n may comprise customer communication devices 134, customer communication server 136, and other systems located at one or more customer systems 130 that send communications, receive communications, or both. Each customer system communication device 134 may provide communication between one or more customer systems 130 and one or more service centers 140, as discussed in more detail below. One or more customer systems 130 may be coupled with one or more service centers 140 by network 150 via one or more communication links 162a-n. Knowledge system 100 may access and monitor service center data 220, (FIG. 2) customer data 222, communication data, 224, customer service ticket data 226, customer service representative factors 228, knowledge resource data 230, knowledge resource ranking factors 232, and communications among customer communication systems 132a-132n associated with a single customer, among customer communication systems 132a-132n associated with multiple customers, and between one or more customer communication systems 132a-132n and one or more service centers 140 or other party that communicates with one or more customer systems 130.

According to embodiments, one or more service centers 140 may be associated with an entity, such as, for example, a business, company, entity, enterprise, distributor, retailer, call-center, CRM specialist system, customer service system, help desk system, telephone or media service, social media service (such as FACEBOOK, TWITTER, or the like), or other like entities that communicate with customers of the one or more service centers 140 or customers of one or more other entities. One or more service centers 140 may comprise server 140 and database 144. Although one or more service centers 140 are illustrated as comprising a single server 140 and a single database 144, embodiments contemplate one or more service centers 140 comprising any suitable number of servers or databases (or other data storage arrangements) at one or more locations which are integral to or separate from the hardware and/or software that supports knowledge system 100, according to particular needs.

In addition, or as an alternative, one or more service centers 140 may comprise service center communication system 146 that communicates with one or more customer systems 130. Service center communication system 146 may comprise service center communication devices 148, and include other systems located at one or more service centers 140 that send and receive communications. Although one or more service centers 140 are shown and described as comprising a single service center communication system 146, embodiments contemplate one or more service centers 140 comprising any number of one or more service center communication systems, each having any number of one or more service center communication devices 148. Each of service center communication devices 148 may provide communication between one or more service centers 140 and one or more customer systems 130.

As described in more detail below, knowledge system 100 may automatically collect data relating to: communications within a single service center communication system 146 of a single service center of one or more service centers 140; among more than one service center communication systems 146 located at one or more service centers 140; and among more than one service center communication systems 146 and one or more customer system communication systems 132a-132n. In addition, and as discussed in more detail herein, service center communication systems 146 may each operate on separate computer systems or may operate on one or more shared computer systems. Each of these one or more computer systems may be a workstation, personal computer, network computer, laptop computer, notebook computer, tablet-type device, smartphone, terminal, or other suitable networked communication device. Embodiments contemplate other communication devices, including, for example, land-line or VoIP telephones, telephone systems, and the like, as described in more detail herein.

One or more system administrators 110 are coupled with network 150 using communication link 160, which may be any wireline, wireless, or other link suitable to support data communication between one or more system administrators 110 and network 150. One or more cloud datastores 120 is coupled with network 150 using communication link 162, which may be any wireline, wireless, or other link suitable to support data communication between one or more cloud datastores 120 and network 150. One or more customer systems 130 are coupled with network 150 using one or more communication links 164a-164n, which may be any wireline, wireless, or other link suitable to support data communication between one or more customer systems 130 and network 150. One or more service centers 140 are coupled with network 150 using communication link 166, which may be any wireline, wireless, or other link suitable to support data communication between one or more service centers 140 and network 150. Although communication links 160-166 are shown and described as generally coupling one or more system administrators 110, one or more cloud datastores 120, one or more customer systems 130, and one or more service centers 140 with network 150, one or more system administrators 110, one or more cloud datastores 120, one or more customer systems 130, and one or more service centers 140 may communicate directly with each other according to particular needs.

In an embodiment, network 150 includes the Internet, telephone lines, any appropriate local area networks LANs, MANs, or WANs, and any other communication network coupling one or more system administrators 110, one or more cloud datastores 120, one or more customer systems 130, and one or more service centers 140. For example, data may be maintained by one or more system administrators 110 or one or more cloud datastores 120 at one or more locations external to one or more system administrators 110 and/or one or more cloud datastores 120 and made available to one or more system administrators 110, one or more cloud datastores 120, one or more customer systems 130, and/or one or more service centers 140 using network 150 or in other appropriate manners. Those skilled in the art will recognize that the complete structure and operation of communication network 150 and other components within knowledge system 100 are not depicted or described. Embodiments may be employed in conjunction with known communication networks and other components.

In one embodiment, one or more system administrators 110, one or more cloud datastores 120, one or more customer systems 130, and/or one or more service centers 140 may each operate on one or more computers or computer systems that are integral to, or separate from, the hardware and/or software that support knowledge system 100. In addition or as an alternative, the one or more users or customer service representatives may be associated with knowledge system 100 including one or more system administrators 110, one or more cloud datastores 120, one or more customer systems 130, and/or one or more service centers 140. These one or more users may include, for example, one or more computers programmed to autonomously monitor communication activity, customer ticket assignment to customer service representatives, editing and ranking of knowledge resources, recommendations of knowledge resources, identification and selection of the plurality of topics and the customer service ticket subject, and/or one or more related tasks within knowledge system 100. As used herein, the term "computer" or "computer system" includes any suitable input device, such as a keypad, mouse, touch screen, microphone, or other device to input information. Any suitable output device that may convey information associated with the operation of knowledge system 100, including digital or analog data, visual information, or audio information. Furthermore, the computer includes any suitable fixed or removable non-transitory computer-readable storage media, such as magnetic computer disks, CD-ROM, or other suitable media to receive output from and provide input to knowledge system 100. The computer also includes one or more processors and associated memory to execute instructions and manipulate information according to the operation of knowledge system 100.

In one embodiment and as discussed in more detail herein, one or more system administrators 110 and/or one or more service centers 140 of knowledge system 100 monitor and score customer service representatives based on one or more customer service representative ranking factors 228 associated with one or more customer systems 130 and/or one or more service centers 140 to provide the customer service representative scores, solution scores, customer service representative skill scores, customer satisfaction scores to the one or more users associated with the one or more service centers 140. In addition, or as an alternative, knowledge system 100 stores and organizes customer service representative scores, solution scores, customer service representative skill scores, customer satisfaction scores based on customer service representative ranking factors 228, such as, for example, a customer service representative skill score associated with at least one of a plurality of topics, a customer satisfaction score associated with a closed customer service ticket, a total time to resolve a closed customer service ticket, whether the closed customer service ticket was reopened prior to final resolution, and the like.

By way of example only and not by limitation, embodiments contemplate one or more service centers 140 comprising, for example, a call center or a retail service desk which sold, serviced, or otherwise provides subscription services to customers associated with one or more customer systems 130. Such subscription services may include, for example, a cloud-based email or voice-over-internet-protocol (VOIP) service. Although particular services are described as subscription services, embodiments contemplate other services or relationships between customers associated with one or more customer systems 130 and entities associated with one or more service centers 140.

Although one or more customer systems 130 are shown and described as comprising only a single associated customer, embodiments contemplate more than one customer associated with one (or more than one) of one or more customer systems 130. For example, the exemplary customer described above may correspond to any number of one or more individuals associated with one or more organizations contacting any number of one or more individuals of one or more service centers 140. Likewise, although only a single point of contact, i.e., a customer service representative is described as being associated with one or more service centers 140, embodiments contemplate more than one point of contact, i.e., multiple customer service representatives at one or more service centers 140. For example, and as discussed above, when one or more service centers 140 provide subscription services to customers, the customers may speak with different customer service representatives of one or more service centers 140 to inquire about various subscription services, various issues, and at various times.

Figure 2:
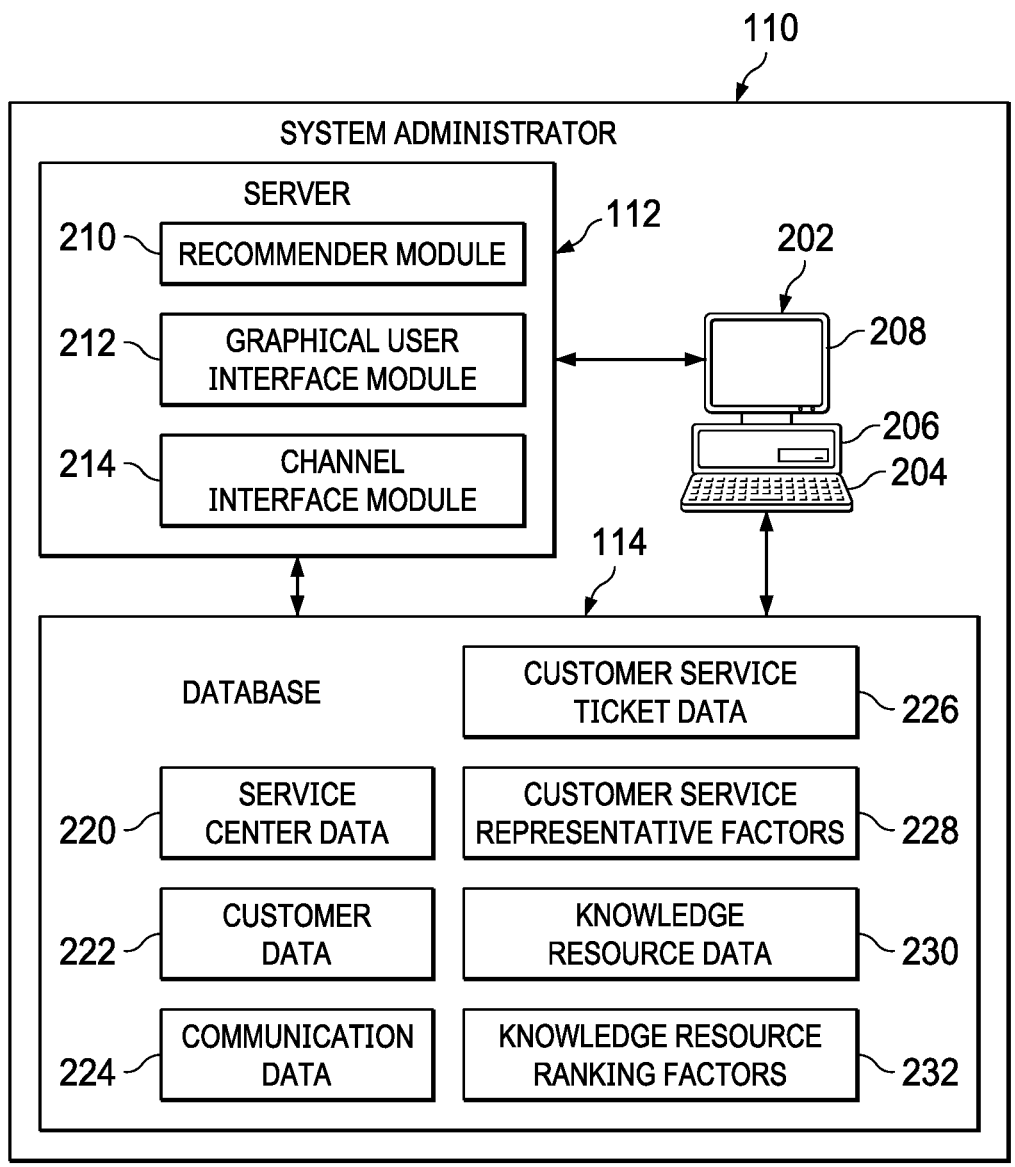
FIG. 2 illustrates the system administrator of FIG. 1 in greater detail, according to an embodiment.

FIG. 2 illustrates system administrator 110 of FIG. 1 in greater detail, according to an embodiment. As discussed herein, system administrator 110 may comprise computer 202, server 112 and database 114. Although system administrator 110 is shown and described as comprising a single computer 202, a single server 112, and a single database 114, embodiments contemplate any suitable number of computers, servers, or databases internal to, or externally coupled with, system administrator 110, according to particular needs. In addition, or as an alternative, system administrator 110 may be located internal to one or more service centers 140. In other embodiments, system administrator 110 may be located external to one or more service centers 140 and may be located in, for example, a corporate or regional service center of one or more service centers 140, according to particular needs.

Computer 202 of system administrator 110 may comprise one or more computers at one or more locations including associated input devices 204, output devices 206, non-transitory computer-readable storage media, processors 208, memory, or other components for monitoring relationships and communication activity of one or more customer systems 130 and one or more service centers 140 based on one or more customer service representative ranking factors 228, in accordance with the operation of knowledge system 100.

Server 112 comprises recommender module 210, graphical user interface module 212, and channel interface module 214. Although a particular configuration of server 112 is shown and described, embodiments contemplate any suitable number or combination of modules, located at one or more locations, local to, or remote from, system administrator 110, according to particular needs. In addition, or as an alternative, recommender module 210, graphical user interface module 212, and channel interface module 214 may be located on multiple servers or computers at one or more locations in knowledge system 100.

Database 114 comprises service center data 220, customer data 222, communication data 224, customer service ticket data 226, customer service representative ranking factors 228, knowledge resource data 230, and knowledge resource ranking factors 232. Although, database 114 is shown and described as comprising service center data 220, customer data 222, communication data 224, customer service ticket data 226, customer service representative ranking factors 228, knowledge resource data 230, and knowledge resource ranking factors 232, embodiments contemplate any suitable number or combination of these, located at one or more locations, local to, or remote from, system administrator 110, according to particular needs.

Service center data 220 of database 114 comprises identification information of one or more service centers 140 of knowledge system 100. Service center data 220 comprises identification information, such as, for example, names, addresses, company, telephone numbers, email, IP addresses, and the like. In one embodiment, recommender module 210 uses service center data 220 to identify one or more service centers 140 in knowledge system 100 to generate particular configurations of knowledge system 100 specific to each of one or more service centers 140. As an example only and not by way of limitation, when one or more service centers 140 comprise one or more customer service centers, system administrator 110 uses the identification information stored in service center data 220 to generate a particularized user interface specific to one or more entities (such as, for example, a business) whose customers are served by the one or more customer service centers 140. According to one embodiment, administration module 210 generates a particularized user interface specific to one or more service centers 140 by, for example, generating a particularized user interface specific to the industry of an entity associated with one or more service centers 140, the types of customers served by one or more service centers 140, the types of products sold by one or more service centers 140 or an entity associated with one or more service centers 140, and providing recommendations that are predicted to assist customer service representatives to more efficiently solve customer service tickets of one or more service centers 140, including, for example, customer service tickets that are unique to one or more service centers 140 and customer service tickets that are not unique to one or more service centers 140 but for which system administrator 110 may generate a recommendation that is different than a recommendation generated for the same customer service ticket in a different one or more service centers 140.

Customer data 222 of database 114 comprises for example, customer ID, customer social security number, customer reoccurring value, customer satisfaction level, customer age, customer sex, customer language, customer race, customer ethnicity, customer religion, customer location, customer highest education level, and customer annual income. Although, particular types of customer data 222 are described, embodiments contemplate utilizing one or more other types of customer data 222, according to particular needs.

Communication data 224 of database 114 may comprise communication activity of one or more customer systems 130 and one or more service centers 140. According to some embodiments, channel interface module 214 records communication activity sent to, or received from, customer system communication devices 134 and service center communication devices 148. In addition, or in the alternative, communication data 224 may comprise data describing communication activity or data collected in connection with one or more users or devices associated with the communication activity, such as, for example, identification of particular communication channels which are open to a particular customer or service center, times which the communication channels are open, the time of a particular communication, the customer or customer service representative that initiated the communication, the communication channel used for the communication, a total time to resolve a closed customer service ticket, protocols or metadata which describe a communication, setup or configuration parameters of channel interface module 214, and the like.

Customer service ticket data 226 of database 114 may comprise data generated or received by one or more service centers 140 in connection with opening, resolving, and/or closing a customer service ticket. The customer service ticket may be associated with an issue of a user of one or more customer systems 130 and one or more customer service representatives of one or more service centers 140. In one embodiment, customer service ticket data 226 includes, but is not limited to: an issue, a subject, a topic, an identity of the user of one or more customer systems 130 which created the customer service ticket, a customer service communication system 132a-132n or an entity associated with one or more customer systems 130 to which the customer service ticket or ticket relates, a communication channel by which one or more customer systems 130 communicated with one or more service centers 140, a number of contacts between one or more customer systems 130 and one or more service centers 140 (historically or for a given time period), a total time spent on each communication channel, a cost associated with each communication activity, a time and a date of the customer service ticket or ticket creation, and a log of the information shared during the communication activity between one or more customer systems 130 and one or more service centers 140. According to some embodiments and as described in more detail below, a subject of a customer service ticket summarizes the issue described in the customer service ticket, and a topic comprises one or more categories of the issues of the customer service ticket. Embodiments contemplate the issues organized according to one or more subjects grouped into one or more topics in a single level of organization or in multiple hierarchical levels of organization, according to particular needs. In addition, or as an alternative, customer service ticket data 226 additionally comprises purchases, sales, subscriptions, purchase history, sales history, and/or other historical data describing the relationship of one or more customer systems 130 to one or more service centers 140. In this way, customer service ticket data 226 provides knowledge system 100 with historical information which provides greater insight by placing current customer service tickets into a historical context describing one or more customers, one or more customer service representatives, and the nature of previous communications or other interactions.

Customer service representative ranking factors 228 may comprise factors used by system administrator 110 to match customers with one or more customer representatives that leads to higher customer satisfaction. According to embodiments, recommender module 210 matches customers of one or more customer systems 130 with customer service representatives of one or service centers 140 based, at least in part, by calculating a customer service representative score based on points and/or weights associated with one or more customer service representative ranking factors 228. Some customer service representative ranking factors 228 comprise demographic information which is matched between the customer and the customer service representative including, for example, age, race, religion, sex, highest level of education, annual income.

Other customer service representative ranking factors 228 comprise evaluations of the customer service representative including, for example, a pleasantness score, tone of voice, a customer engagement score, a ticket completion speed, customer satisfaction score, percentage of re-opened customer service tickets, knowledge of a topic, a customer service representative skill score, speed with handling a topic, other demographics, and the like.

By way of example only and not by way of limitation, recommender module 210 calculates a customer service representative score by organizing customer service representative ranking factors 228 comprising demographics into groups and awarding a particular number of points when the value of the customer and the customer service representative fall into the same group or have the same value. For example, age may be organized into one or more groups such as, for example, 0-25 years old, 26-34 years old, 35-49 years old, 50-65 years old, and 65+ years old; highest level of education may be organized into groups such as, for example, less than high school; high school; associate degree, bachelor's degree, master's degree, and PhD or other advanced degree. Race, religion, and sex may be awarded points when the value for a customer exactly or nearly exactly matches the value for the customer service representative.

For non-demographic customer service representative ranking factors 228, recommender module 212 may award points which are assigned to particular values or a range of values. For example, each of a pleasantness score, a tone of voice score, and a customer engagement score, may comprise a score of 0-100. Recommender module 212 may award points according to the following: score of 0-10=1 point, 11-20=2 points, 21-40=4 points, 41-80=10 points, and 81-100=20 points. Ticket completion speed may comprise a percentage of tickets that are completed within a predetermined time period. Percentage of reopened customer tickets may comprise a percentage of customer tickets that are not reopened with a predetermined number of days.

Because some of customer service representative ranking factors 228 may be more important than others, when calculating the customer service representative score, weights may be added to each of the customer service representative ranking factors 228 which increase or decrease the importance of the points associated with the customer service representative ranking factors to the overall sum of all points of customer service representative ranking factors 228. In addition, recommender module 212 may adjust points and/or weights over time based on the accuracy of the outcomes. For example, when recommender module 212 matches customers with one or more customer service representatives of one or service centers 140 based on points and/or weights, as described above, recommender module 212 may monitor the accuracy of the matches, and, when the outcome for those matches do not improve over time, recommender module 212 adjusts points and/or weights to improve the matches predicted by the calculations, as described below.

For example, the customer service representative score may comprise the following weights and points associated with the following exemplary customer service representative ranking factors 228 of TABLE 1:

TABLE 1

| Customer Service Representative Factor | How Points are Assigned | Points | Weight |
|---|---|---|---|
| Age (Groups: 0-25 years old, 26-34 years old, 35-49 years old, 50-65 years old, and 65+ years old) | Match Group | 15 points | 0.75 |
| Sex | Match Value | 20 points | 1.25 |
| Highest Level of Education (Groups: less than high school; high school; associate degree, bachelor's degree, master's degree, and PhD or other advanced degree) | Match Group | 5 | 0.75 |
| Pleasantness Score Tone of Voice Score | Based on Score | 0-10 = 1 point<br>11-20 = 2 points<br>21-40 = 4 points<br>41-80 = 10 points<br>81-100 = 20 points | 1.00 |
| Ticket Completion Speed (Percentage of tickets completed within predetermined time) | | 0-10 = 0 point<br>11-20 = 1 points<br>21-40 = 2 points<br>41-80 = 5 points<br>81-100 = 10 points | 1.00 |
| Percentage of Reopened Customer Tickets | | 0-10 = 20 point<br>11-20 = 10 points<br>21-40 = 5 points<br>41-80 = 4 points<br>81-100 = 0 points | 1.00 |

Example 1: In this example, the customer service representative score for an exemplary customer service representative (Agent A) who is 25 years old, male, has an associate degree, and a pleasantness score of 50, tone of voice score 75, ticket completion speed of 85%, percentage of reopened tickets of 6% and Customer A who is 45 years old, female, and has an associate degree would be 0(0.75)+0(1.25)+5 (0.75)+10(1.00)+10(1.00)+10(1.00)+20(1.00)=53.75.

Example 2: The customer service representative score for Agent A and Customer B who is 22 years old, male, and has a high school degree would be: 15(0.75)+20(1.25)+0(0.75)+ 10(1.00)+10(1.00)+10(1.00)+20(1.00)=86.25. In addition, and as described above, recommender module 212 may check whether Agent A and Customer B are a good match and increase or decrease the points and/or weights so that the outcome of the calculation is a better match, as discussed above.

As described in more detail below, recommender module 210 calculates a customer satisfaction score for a customer service representative by assigning points and/or weights to particular data associated with the satisfaction of customers associated with customer service tickets closed by the customer service representative including, for example, receiving a positive survey response by a customer of one or more customer systems 130 in response to handling or solving a customer service ticket, no new customer service tickets within a particular time period from the same customer associated with the closed customer service ticket, and/or one or more additional factors described herein. Survey responses indicate the positive and/or negative customer satisfaction score of a customer of one or more customer systems 130 based on completed surveys. For example, in some embodiments, when one or more service centers 140 indicates that a status of a ticket is resolved or closed, system administrator 110 sends a survey to one or more customer systems 130. In addition, or as an alternative, system administrator 110 may send surveys to one or more customer systems 130 at the discretion of one or more service centers 140 and not based on a particular status of a ticket. The results of the survey are calculated by recommender module 210, and the results are stored as customer data 222 and/or customer service representative ranking factors 228, and may include a list of all or a selection of the most recent survey responses for the one or more customer systems 130, a ticket number associated with the survey response, the customer service representative of one or more service centers 140 that handled the ticket associated with the survey response, and a customer satisfaction score indication whether a customer of one or more customer systems 130 indicated on the survey that the resolution of the ticket was positive or negative.

In an embodiment and in order to indicate the operation of surveys within system administrator 110, TABLE 2 provides the following particular examples.

TABLE 2

| Survey | Name | Scheduled and Survey Rules | Customer Satisfaction Score Points for Negative Response | Customer Satisfaction Score Points for Positive Response |
|---|---|---|---|---|
| After Contact Survey | Survey 1 | Send 24 hours after ticket closed | −15 | +15 |
| Regular Survey | Survey 2 | Send every 12 month to every customer | −20 | +20 |

Assume in the following examples that a customer of one or more customer systems 130 starts with a customer satisfaction score of 100 points, where 100-75 indicates a positive customer satisfaction score, 74-31 indicates a neutral customer satisfaction score, and 30-0 indicates a negative customer satisfaction score, the points awarded for a positive and negative survey are according to TABLE 2, and the points subtracted for having a new customer service ticket within a particular time period from the same customer associated with the closed customer service ticket is 20 points for less than 30 days and 15 points for more than 30 days but less than 60 days. Although particular ranges of points are described as associated with a positive customer satisfaction score, a neutral customer satisfaction score, and a negative customer satisfaction score, the ranges and the level of satisfaction assigned to each range are adjustable by customer representatives of one or more service centers 140, as described in more detail below. In addition, although the customer satisfaction score is described in connection with a level of customer satisfaction (positive, neutral, and negative), embodiments contemplate associating other characteristics with the customer satisfaction score, such as, for example, a level of happiness (happy, neutral, unhappy), and the like.

Example 3: On Jan. 1, 2017, one or more customer systems 130 represented by Customer A calls a customer service representative of one or more service centers 140 to set up a new service. One or more service centers 140 represented by Agent A opens a new ticket and assigns the topic relating to setting up a new service. Customer A wishes to set up a product, so Agent A assigns a second topic associated with setting up a new product. After helping Customer A set up the new service and the new product, an after contact survey is sent to Customer A who gives a negative response. Therefore, Customer A would have 15 points subtracted from the customer satisfaction score, giving a customer satisfaction score for Customer A of 85 points, which indicates a happy customer satisfaction score.

Example 4: The same Customer A from Example 1 calls Agent A on Feb. 1, 2017. Customer A is experiencing a problem with the product that was set up in Example 1. Because Customer A currently has a satisfaction score of 85 points and the problem is related to the same ticket and happened after 30 days but less than 60 days, 15 points are subtracted from the customer satisfaction score of Customer A, which is now 70 points. After helping Customer A resolve the problem with the product, an after contact survey is sent to Customer A who gives a negative response. Therefore, Customer A would have 15 points subtracted from the customer satisfaction score (currently 70 points) giving a customer satisfaction score for Customer A of 55 points, which indicates a neutral customer satisfaction score.

By way of explanation and not of limitation and as stated above, Agent A representing one or more customer representatives of one or more service centers 140 adjusts ranges associated with each of the levels of satisfaction (positive, neutral, negative) of Customer A. Continuing with the non-limiting example, although 100-75 is described as comprising a positive customer satisfaction score, 74-31 is described as comprising a neutral customer satisfaction score, and 30-0 is described as comprising a negative customer satisfaction score, Agent A adjusts ranges so that a positive customer satisfaction score comprises a range of 100-91 points, a neutral customer satisfaction score comprises 90-81 points, and a negative customer satisfactions core comprises a range of 80-0 points. After adjustment of the ranges associated with the customer satisfaction score, the calculation described above giving Customer A customer satisfaction score of 55 points would indicate a negative customer satisfaction.

Additionally and also as described in more detail below, recommender module 210 calculates a customer service representative skill score by assigning points and/or weights to particular data associated with the skill of the customer service representative of one or more service centers 140 in handling customer service tickets associated with a particular topic including, for example, a number of customer service tickets worked by the customer service representative for the topic, an average time to resolve customer service tickets for the topic, a customer satisfaction score for the topic, a manual adjustment by a supervisor of the customer service representative, and/or one or more additional factors described herein.

For example, the customer service representative skill score may comprise the following weights and points as illustrated in TABLE 3.

TABLE 3

| Customer Service Representative Skill | How Points are Assigned | Points | Weight |
|---|---|---|---|
| Number of Customer Service Tickets for the Topic | Number of Tickets | 0-10 = 1 point<br>11-20 = 2 points<br>21-40 = 4 points<br>41-80 = 10 points<br>81-100 = 20 points | 0.5 |
| Average Time to Resolve Customer Service Tickets for the Topic | Percentile Compared with Average of Other Customer Service Representatives | 0-10 = 1 point<br>11-20 = 2 points<br>21-40 = 4 points<br>41-80 = 10 points<br>81-100 = 20 points | 0.75 |
| Customer Satisfaction Scores for Topic | Average Customer Satisfaction Score for Topic | 0-30 = 0 points<br>31-74 = 10 points<br>75-100 = 20 points | 0.75 |
| Manual Adjustment by Supervisor of Customer Service Representative | | Any number of points that may be manually selected. | 1.00 |

Example 5: For a particular topic, Agent A has handled 40 tickets, falls within the $60^{th}$ percentile of average time to resolve customer service tickets when compared with all other customer service representatives who have handled tickets for the particular topic, has an average customer satisfaction score this topic of 80, and has received no manual adjustment of the score by the supervisor. To calculate a customer service representative skill score for Agent A comprises: $4(0.5)+10(0.75)+20(0.75)+0(1.00)=24.5$.

Example 6: A second customer service representative, Agent B, has handled 90 tickets, has an average time to resolve customer service tickets that falls within the $95^{th}$ percentile, has an average customer satisfaction score for of 40, and has received a manual adjustment by a supervisor of 30 points. To calculate a customer service representative skill score for Agent B comprises: $20(0.5)+20(0.75)+10(0.75)+30(1.00)=61.5$.

Knowledge resource data 230 of database 114 comprises information generated in connection with addressing one or more customer issues from an unresolved customer service ticket and reference material provided to customer service representatives to assist in resolving one or more customer issues of an unresolved customer service ticket. According to some embodiments, knowledge resource data 230 comprises wikis, whose contents and structure are configured to be edited in real-time by one or more users associated with one or more service centers 140. In addition, knowledge system 110 generates recommendations comprising knowledge resource data 230 to customer service representatives to assist in resolving a customer issue.

Knowledge resource ranking factors 232 of database 114 comprise one or more factors used to generate a solution score of a knowledge resource of knowledge resource data 230. According to embodiments and as described in more detail below, recommender module 210 may generate a solution score of a knowledge resource by assigning points and/or weights to particular data associated with solving a customer service ticket such as, for example, one or more of: receiving a positive survey response by a customer of one or more customer systems 130 in response to a one or more service centers 140 closing a customer service ticket; solving a customer service ticket in less time than a predetermined time (such as, for example, as indicated in a service level agreement); not reopening a solved customer service ticket; and not opening a new customer service ticket within a particular time period for the same customer associated with a solved customer service ticket.

TABLE 4

| Knowledge Resource Ranking Factor | Points | Weight |
|---|---|---|
| Positive Response to After Contact Customer Survey | 20 | 1.25 |
| Negative Response to Customer Survey | -5 | 1.5 |
| Resolving Ticket Within Agreed Time | 15 | 1.0 |
| Closed Ticket is Not Reopened | For 1 days: 2 points<br>For 3 days: 5 points<br>For 7 days: 15 points<br>For 30 days: 30 points | 0.5 |
| No New Ticket is Opened for Same Topic | For 30 days: 15 points<br>For 60 days: 30 points<br>For 120 days: 40 points | 0.75 |

Example 7: On Mar. 1, 2017, Agent A handles a customer request for a password reset for Customer C. While helping Customer C, Agent A accesses a wiki from the knowledge resources associated with a password reset topic. While using the wiki to help Customer C, Agent A edits the wiki and saves the changes, which are stored in knowledge resource data 230. Agent A helps Customer C reset a password in five minutes, which is less than the eight minutes outlined in the service level agreement between one or customer systems 130 of Customer C and one or more service centers 140 of Agent A. After closing the ticket for Customer C, an after contact customer survey is sent to Customer C who gives a positive response. Customer C does not call back with another password reset request. Calculating a solution score for the knowledge resource comprising a password reset wiki comprises: $20(1.25)+15(1.0)+30(0.5)+40(0.75)=85$.

Example 8: On Apr. 15, 2017, Agent B handles a customer request for a password reset for Customer D. While helping Customer D, Agent B accesses the password reset wiki edited by Agent A in Example 7, above. Agent B helps Customer D reset a password in ten minutes, which is greater than the eight minutes outlined in the service level agreement. After closing the ticket for Customer D, an after contact customer survey is sent to Customer D, who gives a negative response. On Apr. 17, 2017, Customer D calls back again to one or more service centers 140 with a password reset request. Agent C, who recommender module 202 assigns to handle Customer D's request, reopens the ticket previously closed by Agent B. Agent C helps Customer D reset the password within five minutes, and Customer D gives a positive response to the after contact survey. Customer D does not call back with another password reset request.

Calculating a solution score for the knowledge resource comprising a password reset wiki comprises first calculating a solution score for the interaction between Agent B and Customer D: $-5(1.25)+0(1.0)+2(0.5)+40(0.75)=24.75$ and recalculating the solution score after the interaction between Agent C and Customer D: $20(1.25)+15(1.0)+30(0.5)+40(0.75)=85$, and calculating the average of the two solution scores: $24.75+85/2=54.75$.

As described in more detail below, recommender module 210 compares solution scores for a plurality of knowledge resources associated with a particular topic and displays to the customer service representatives handling that topic one or more of the top-ranked knowledge resources based on their calculated solution scores. Although particular examples of knowledge resource ranking factors 232 are described, embodiments contemplate additional knowledge resource ranking factors 232 calculated from one or more metrics or data stored in one or more of customer service data 220, customer data 222, communication data 224, customer service ticket data 226, customer service representative ranking factors 228, and knowledge resource data 230 including, for example, a customer service representative score, a customer service representative skill score, a customer satisfaction score, and/or the like.

Recommender module 210 of server 112 may configure, update, and/or manage the operation of knowledge system 100. That is, recommender module 210 may provide services to configure the operation of knowledge system 100 and change which data is executed and/or stored on system administrator 110, one or more cloud datastores 120, one or more customer systems 130, and/or one or more service centers 140. Embodiments contemplate a user-configurable system, such that the data may be stored either singularly or redundantly on system administrator 110, one or more cloud datastores 120, one or more customer systems 130, and/or one or more service centers 140, according to particular needs. As described in more detail below, recommender module 210 recommends knowledge resources to customer service representatives of one or more service centers 140 by identifying topics and/or subjects associated with a customer service ticket, using a distance metric to identify related knowledge resources, and sorting and updating the knowledge resources by calculating one or more of customer service representative scores, solution scores, customer service representative skill scores, and/or customer satisfaction scores.

According to one embodiment, the distance metric comprises a natural language processing method that scores the similarity between text of the topic and/or the subject assigned to a customer service ticket and the text contained within the knowledge resources. Recommender module 210 assigns one or more of the knowledge resources having the highest similarity between the topic and/or the subject of the customer service ticket to the customer service representative working on the customer service ticket, and graphical user interface module 212 displays the one or more assigned knowledge resources to the customer service representative.

For example, if there are one thousand knowledge resources, and the graphical user interface module 212 is set to display the top three most similar knowledge resources for a particular topic, then after recommender module 210 calculates the distance metric for the subject and/or the topic assigned to a customer service ticket and the one thousand knowledge resources, graphical user interface 212 displays the three knowledge resources having the highest similarity scores with the customer service ticket. According to embodiments, the distance metric comprises a Levenshtein distance. When a customer ticket exceeds a predetermined length, recommender module 210 identifies keywords or phrases from the customer ticket and calculates the distance metric between the knowledge resources and the identified keywords or phrases. According to a particular embodiment, recommender module 210 uses a TextRank method to identify keywords and/or phrases from the customer ticket. By way of example only and not of limitation, recommender module 212 calculates the distance metric between the subject and/or topic of a customer ticket and a knowledge resource by assigning weighted points to a matched subject of the customer ticket and the knowledge resource, a matched topic of the customer ticket and the knowledge resource, a customer service representative of a ticket not matching a customer service representative of a knowledge resource, recentness of the customer ticket and the knowledge resource, a resolved ticket, a ticket that is not reopened, and a ticket that received a positive survey.

Graphical user interface module 212 of server 112 generates a graphical user interface comprising graphics, text, and interactive elements providing for display, configuration, editing, selection, receipt, and transmission of: knowledge resources (including one or more wikis, one or more closed customer service tickets, hierarchies of topics and subjects identified from customer service tickets, etc.); data analytics (charts, graphs, metrics, infographics, etc.); parameters for the collection, retrieval, analysis, and storage of service center data 220, customer data 222, communication data 224, customer service ticket data 226, customer service representative ranking factors 228, knowledge resource data 230, and knowledge resource ranking factors 232; and user or system notifications, including, for example, recommendations for resolving one or more customer issues described in a customer service ticket, closing the customer service ticket, and contacting the customer service representative that created the recommendation. In addition, or as an alternative, the recommendation may be displayed to the customer service representative each time a user of the one or more customer systems 130 initiates communication activity, during or in connection with a responsive communication, and/or for the duration of a communication or the preparation of a communication. According to embodiments, graphical user interface module 212 selects information to include in a knowledge resource, such as a wiki, based on one or more of customer service representative scores, solution scores, customer service representative skill scores, and customer satisfaction scores.

One or more service centers 140 uses graphical user interface module 212 to create, modify, and manage topics and/or scores, penalties, and values associated with topics and subjects. As an example only and not by way of limitation, graphical user interface module 212 provides one or more service centers 140 with options to generate new topics, reorganize the hierarchy of topics, assign scores, penalties, and values to one or more topics and subjects, and associate knowledge resources with topics or subjects, as explained below.

According to an embodiment, channel interface module 214 of server 112 monitors communication activity of one or more customer systems 130 and one or more service centers 140. For example, channel interface module 214 may comprise one or more of VOIP, email, internet or web-based chat, and/or other communication channels for receiving and transmitting communications of customer system communication systems 132a-132n and service center communication systems 146. For example, channel interface module 214 may initiate or receive communication to customer system communication devices 134 and/or service center communication devices 148. According to some embodiments, channel interface module 214 monitors and records the time, duration, date, voice, text, and other like communication data 224 of one or more communication activities.

By collecting communication data 224 using the channel interface module 214, system administrator 110 improves and automates topic- and subject-specific ranking of knowledge resources for customer service representatives. In one embodiment and as discussed in more detail herein, one or more system administrators 110 and/or one or more service centers 140 of knowledge system 100 monitor and score customer service representatives based on one or more customer service representative ranking factors 228 associated with one or more customer systems 130 and/or one or more service centers 140 to provide the customer service representative scores, solution scores, customer service representative skill scores, customer satisfaction scores to the one or more customer service representatives associated with the one or more service centers 140. Embodiments of system administrator 110 may be specifically tailored to a particular business environments, such as, for example, a call center environment, a professional office organization environment, or other business environments, in which, a customer is communicating with one or more service centers 140, according to particular needs.

In one embodiment, system administrator 110 comprises a centralized computer system which operates system-level architecture of knowledge system 100. In this manner, system administrator 110, through one or more modules, provides a knowledge system 100 for use by one or more customer service representatives and which provides for efficiently resolving customer service tickets from a single and/or central location while maintaining a high level of customer satisfaction.

Figure 3:
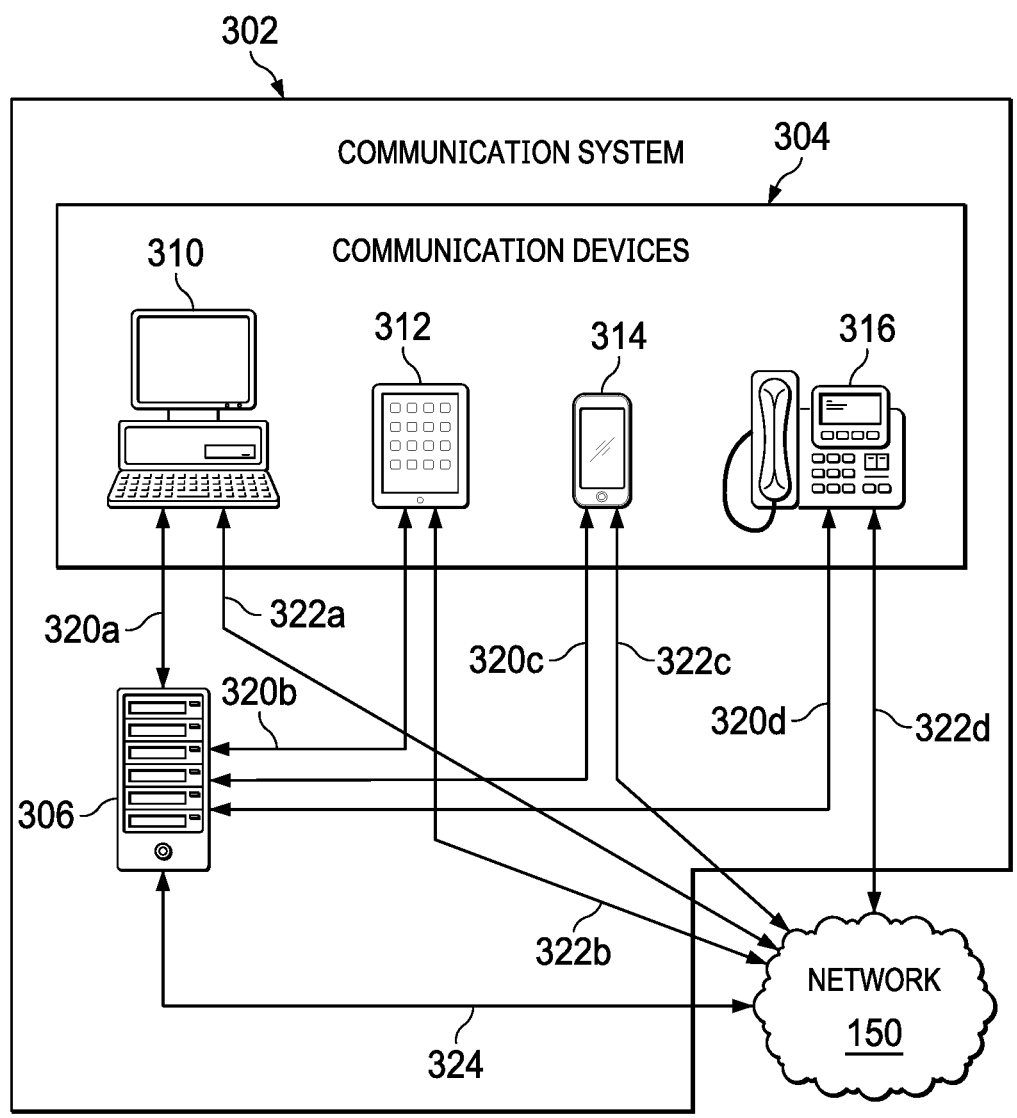
FIG. 3 illustrates an exemplary communication system in greater detail, according to an embodiment.

FIG. 3 illustrates exemplary communication system 302, in accordance with an embodiment. According to embodiments, exemplary communication system 302 represents customer service communication systems 132a-132n of one or more customer systems 130 and/or service center communication systems 146 of one or more service centers 140. Exemplary communication system 302 may comprise communication devices 304, server 306, and/or communication links 320a-320d, 322a-322d, and 324 which may be configured to communicate with network 150, system administrator 110, one or more cloud datastores 120, customer service communication systems 132a-132n of one or more customer systems 130 and service center communication system 146 of one or more service centers 140. In one embodiment, exemplary communication system 302 may comprise computer system 310 that operates on one or more shared or separate computer systems. Computer system 310 may comprise one or more of as a work station, personal computer, network computer, laptop computer, or notebook computer. In addition, exemplary communication devices 304 may comprise one or more other communication devices 304 such as, for example, a tablet-type device 312, smartphone 314, a terminal, or other suitable communication device. According to some embodiments, exemplary communication devices 304 comprise a land-line or VoIP telephone 316. According to embodiments each of one or more communication devices 304 are configured to communicate with one or more other communication devices 304, server 306, and/or network 150 over one or more communication links 320a-320d, 322a-322d, and 324.

Computer systems 310, tablet-type devices 312, smartphones 314, and land-line or VoIP telephones 316 may comprise a processor, memory and data storage. The processor may execute an operating system program stored in memory to control the overall operation of the computer systems 310, tablet-type devices 312, and/or smartphones 314. For example, the processor may control the reception of signals and the transmission of signals within knowledge system 100. The processor may execute other processes and programs resident in memory, such as, for example, registration, identification or communication over one or more communication channels 402a-402n and move data into or out of the memory, as required by an executing process.

According to embodiments, each communication devices 304 of exemplary communication system 302 may be assigned one or more identification numbers, such as, for example, IP addresses, serial numbers, or telephone numbers that may be used to identify communication devices 304. According to some embodiments, each of communication devices 304 is associated with a single identification number, such as an IP or MAC address. In addition, or as an alternative, exemplary communication system 302 may be local to, or remote from, one or more customer systems 130 and one or more service centers 140. That is, customer system communication devices 134 may communicate with service center communication devices 148. For example, system administrator 110 is programmed to monitor and analyze communication activity via one or more communication channels 402a-402n, such as, for example, telephone calls, emails, instant, chat or text messaging, and other like communication activity of one or more customer systems 130 and one or more service centers 140.

Those skilled in the art will recognize that one or more specific examples of exemplary communication systems 302 are given by way of example and that for simplicity and clarity, only so much of the construction and operation of exemplary communication system 302 as is necessary for an understanding of the present invention is shown and described. Moreover, it is understood that exemplary communication system 302 should not be construed to limit the types of devices in which embodiments of the present invention may be implemented. For example, exemplary communication system 302 may include other suitable exemplary communication devices 304, including, but not limited to, conventional cellular or mobile telephones, smart mobile phones, an IPHONE™, an IPAD™, wireless tablet devices, paging devices, personal digital assistant devices, short message service (SMS) wireless devices, portable computers, or other device capable of wireless or network communication.

Figure 4:
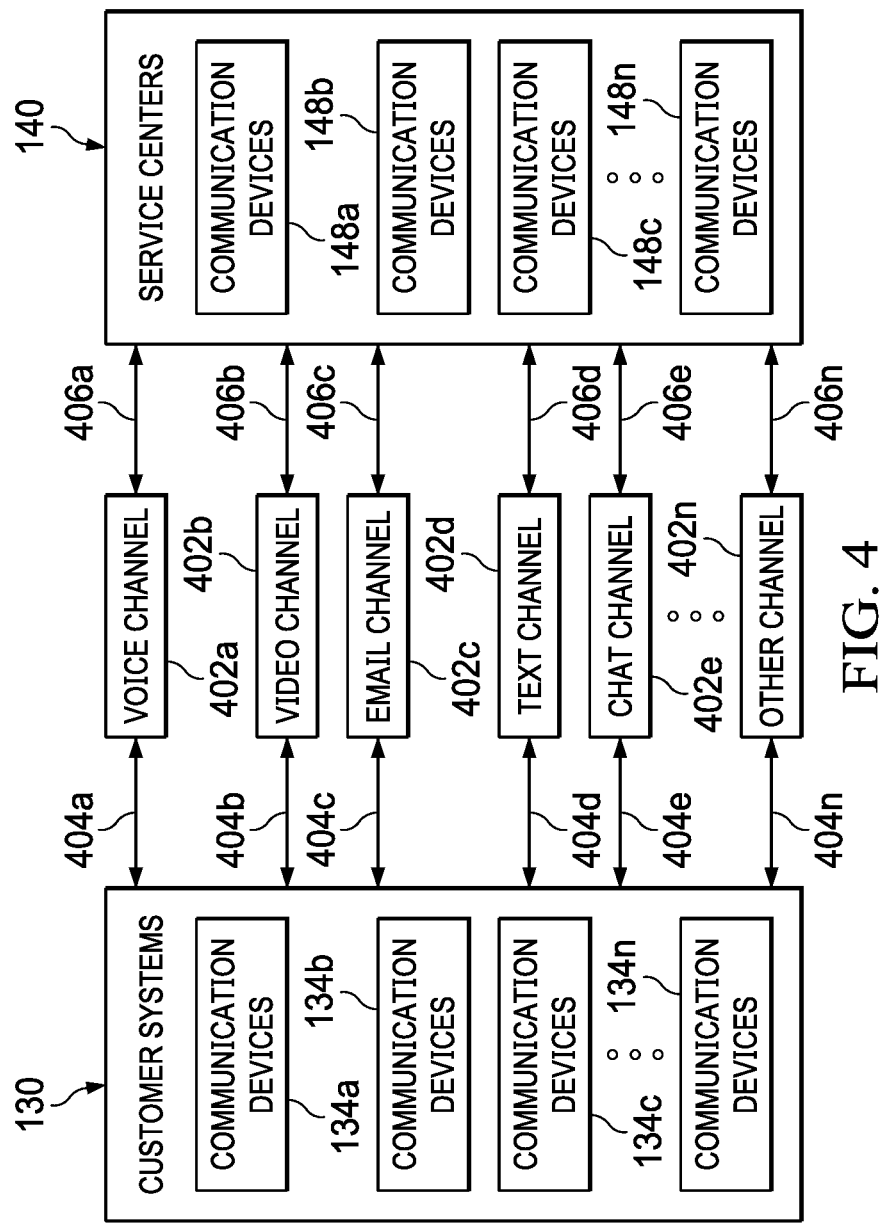
FIG. 4 illustrates one or more communication channels associated with one or more customer systems and one or more service centers, according to an embodiment.

FIG. 4 illustrates one or more communication channels 402a-402n associated with one or more customer systems 130 and one or more service centers 140, according to an embodiment. As discussed above, customer system communication devices 134 may communicate with service center communication devices 148 via one or more communication channels 402a-402n. One or more users associated with one or more customer systems 130 may communicate with one or more customer service representatives of one or more service centers 140 over various communication channels 402a-402n. As described herein, communication channels 402a-402n may include one or more communication links 404a-404n and 406a-406n, which may be any wireline, wireless, or other link suitable to support data communication among one or more customer systems 130, one more service centers 140, network 150, and/or one or more additional networked communication systems, including, for example, one or more networked computer systems supporting voice communication channel 402a, video communication channel 402b, email communication channel 402c, text communication channel 402d, chat communication channel 402, and any one or more additional other communication channel 402n. As an example only and not by way of limitation, a user of one or more customer system communication devices 134a-134n may use a cell phone or land line to communicate with a customer service representative of a service center using voice communication channel 402a to inquire about various subscription service issues. On another occasion, the same user may use another one or more customer system communication devices 134a-134n to communicate with a different customer service representative using a different one or more communication channels 402a-402n to inquire about other subscription service issues. Although, particular one or more customer system communication devices 134a-134n, particular one or more service center communication devices 148a-148n, and particular one or more communication channels 402a-402n are shown and described, embodiments contemplate any number of users associated with any one or more customer system communication devices 134a-134n, any number of customer service representatives associated with any one or more service center communication devices 148a-148n over any communication channel 402a-402n, according to particular needs.

Figure 5:
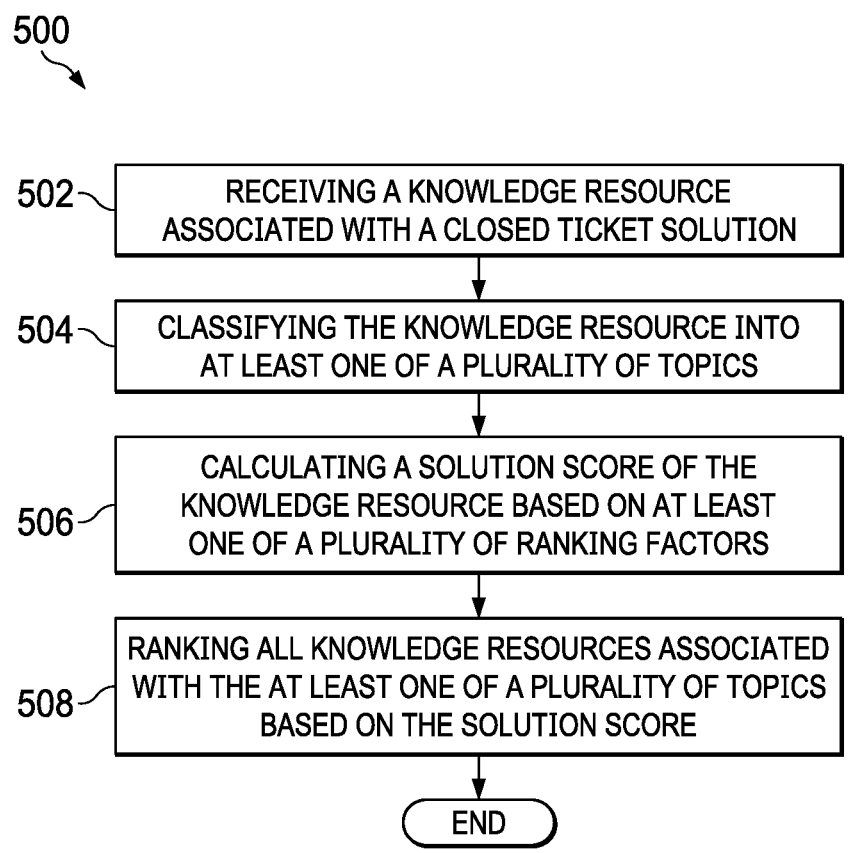
FIG. 5 illustrates an exemplary method of ranking a knowledge resource, according to an embodiment.

FIG. 5 illustrates an exemplary method 500 of ranking a knowledge resource, in accordance with an embodiment. Method 500 of ranking a knowledge resource proceeds by one or more activities, which although described in a particular order may be performed in one or more permutations, according to particular needs.

Method 500 begins at activity 502 where recommender module 210 of system administrator 110 receives a knowledge resource associated with a solution to a closed customer service ticket. For example and as described herein, recommender module 210 may receive a knowledge resource from knowledge resource data 230 and comprising explanatory information for resolving at least one customer issue associated with a customer service ticket. According to some embodiments, the knowledge resource comprises a wiki that is edited by one or more customer service representatives of one or more service centers 140 in connection with resolving one or more customer issues of a customer associated with one or more customer systems 130, such as, for example, one or more customer issues identified in a customer service ticket. By way of further explanation only and not by limitation, embodiments contemplate one or more service centers 140 comprising, for example, a call center or a retail service desk which sold, serviced, or otherwise provides subscription services to customers associated with one or more customer systems 130. Such subscription services may include, for example, a cloud-based email or voice-over-internet-protocol (VOIP) service. Although particular services are described as subscription services, embodiments contemplate other services or relationships between customers associated with one or more customer systems 130 and entities associated with one or more service centers 140. Continuing with this example, recommender module 210 may access and/or receive a knowledge resource from knowledge resource data 320 comprising explanatory information for resolving a customer issue such as, for example, a problem with the customer's cloud-based email service. The knowledge resource received or accessed by the recommender module 210 may comprise a wiki explaining troubleshooting procedures for resolving a specific issue with the customer's cloud-based email service, such as, for example, resetting a password or network settings, diagnosing a connection problem, importing and exporting a contact list, setting up a new email address, and/or the like.

At activity 504, recommender module 210 classifies the knowledge resource according to at least one topic. As discussed above, a topic may comprise one or more categories in which the issues of customer service tickets are organized. According to embodiments, recommender module 210 classifies the knowledge resource according to the topic of the closed customer service ticket of the associated solution. The topics may be received from one or more customer systems 130 and/or one or more customer systems 140 to describe categories of the subjects of the customer service tickets. In addition, or as an alternative, one or more users of one or more customer systems 130 may generate custom topics and the one or more users of one or more customer systems 130 and/or one or more customer service representatives of one or more service centers 140 apply one or more of the topics to the customer service tickets.

In yet a further embodiment, recommender module 210 classifies a knowledge resource by predicting a topic for the customer service ticket associated with the solution by analyzing customer service ticket data 226 of the customer service ticket and/or the knowledge resource data 230 of the knowledge resource. Continuing with the previous example, recommender module 210 may identify the topic of the solved customer service ticket as "password reset—email" comprising a topic associated with a customer issue for resetting a password of the cloud-based email service. Recommender module 210 may search the text of the customer service ticket for one or more keywords within the text, such as, for example, "password", "reset", "username", "email" and/or other like text, including for example, assigning a topic to a solved customer service ticket based on the topic of other customer service tickets having text that matches text of the solved customer service ticket. In response to matching text of the solved customer service ticket to text indicating the topic is a "password reset—email" topic, recommender module 210 associates the topic "password reset—email" to the solved customer service ticket and classifies the knowledge resource associated with the solution to the solved customer service ticket also with the topic "password reset—email". Although the recommender module 210 is described as associating a "password reset—email topic" with the solved customer service ticket and the knowledge resource, embodiments contemplate associating any topic with any solved customer service ticket or any knowledge resource to categorize any customer issue using the topic assigned by one or more users, based on matching customer service ticket data 226, knowledge resource data 230, and one or more additional factors described herein, according to particular needs.

At activity 506, recommender module 210 calculates a solution score of the knowledge resource by scoring one or more knowledge resource ranking factors 232. As stated above, recommender module 210 may calculate a solution score based, at least partially, on one or knowledge resource raking factors 232 including, for example, one or more of: receiving a positive survey response by a customer of one or more customer systems 130 in response to a one or more service centers 140 closing a customer service ticket; solving a customer service ticket in less time than a predetermined time (such as, for example, as indicated in a service level agreement); not reopening a solved customer service ticket; and not opening a new customer service ticket within a particular time period for the same customer associated with a solved customer service ticket. In addition, or in the alternative, embodiments contemplate recommender module 210 calculating a solution score based on one or more additional factors including, for example, customer service representative ranking factors 228 including, for example, a customer service representative skill score associated with a topic of the knowledge resource and a customer satisfaction score of one or customers for the closed customer service ticket associated with the knowledge resource. Continuing with the previous example of the knowledge resource associated with a "password reset—email" topic, a solution score may be calculated by generating a weighted sum of points associated with receiving a positive response from a customer survey generated after closing the solved customer service ticket, solving the solved customer service ticket within a predetermined time period for customer service tickets categorized under a "password reset—email" topic, the solved customer service ticket was not reopened within a particular time period, such as, for example, one year, and no new customer service tickets for the customer of the solved customer service ticket were opened within a predetermined time period, such as, for example, one month. Although the predetermined time periods are associated with particular time periods, embodiments contemplate selecting other suitable time periods, such as, for example, any number of hours, days, weeks, months, years, or other like time periods.

Figure 6:
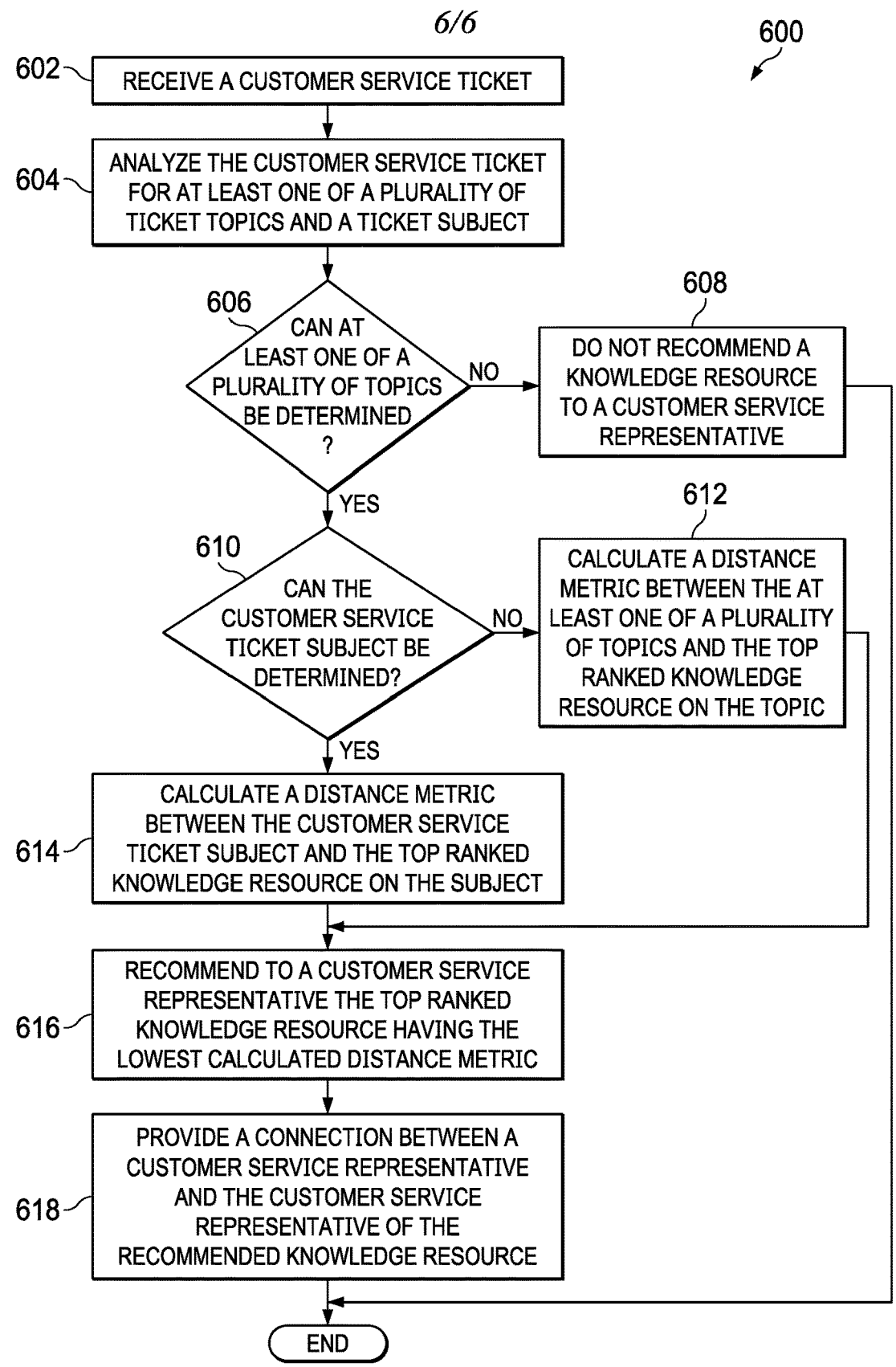
FIG. 6 illustrates an exemplary method of recommending a knowledge resource to a customer service representative, according to an embodiment.

At activity 508, recommender module 210 ranks the knowledge resources associated with the at least one of a plurality of topics based on the solution score. In some exemplary configurations of method 500, recommender module 210 ranks the knowledge resources by sorting the knowledge resources from the highest solution score to the lowest solution score for at least one topic. According to embodiments, recommender module 210 provides real-time ranking of previously created knowledge resources stored within knowledge resource data 230 or new knowledge resources recently created by one or more customer service representatives of one or more service centers 140. Graphical user interface module 212 may render for display the real-time rankings of the knowledge resources organized and sortable according to topic-specific rankings updated in real time and accessible in real-time by any number, including all, of the customer service representatives of one or more service centers 140. The topic-specific rankings may identify the knowledge resources that are calculated to resolve a customer issue of one or more customer service tickets most efficiently while maintaining high levels of customer satisfaction. Continuing with the example described above of a solved customer service ticket associated with a "password reset—email" topic, the knowledge resource associated with the solution of the solved customer service ticket may be ranked with other knowledge resources which are classified with a "password reset—email" topic based on the calculated solution scores for each of the knowledge resources. As knowledge resource ranking factors 232 are updated based on received data, new knowledge resources are created, and/or previously created knowledge resources are edited, the rankings of these knowledge resources may be updated in real-time and the rankings and/or the knowledge resources may be automatically provided to a customer service representative based on a topic of an open or unresolved customer service ticket currently assigned to the customer service representative. FIG. 6 illustrates an exemplary method 600 of recommending a knowledge resource to a customer service representative, according to an embodiment. Method 600 of recommending a knowledge resource to a customer service representative proceeds by one or more activities, which although described in a particular order may be performed in one or more permutations, according to particular needs.

Method 600 begins at activity 602 where recommender module 210 of system administrator 110 receives an open or unresolved customer service ticket. Continuing with the above example, a customer associated with one or more customer systems 130 may initiate a communication to one or more service centers 140, which connects the customer's customer system communication device 134 of one or more customer systems 130 with a customer service representative associated with a service center communication device 148 of one or more service centers 140. For example, the customer may call one or more service centers 140 to inquire about a particular issue, such as, for example, inquiring how to reset a password of a web-based email program. When one or more service centers 140 receives the customer's communication, channel interface module 214 identifies the communication channel 402a-402n as being a voice communication channel 402a initiated by the telephone call and generates an open or unresolved customer service ticket by, for example, reopening a previously closed or solved customer service ticket and/or creating a new customer service ticket.

At activity 604, recommender module 210 analyzes the open or unresolved customer service ticket for one or more topics of a plurality of topics and one or more subjects. According to embodiments, recommender module 210 utilizes natural language processing or keyword searching when analyzing the open or unresolved customer service tickets. Continuing with the previously-described example of a customer inquiring about a password reset of a web-based email program, recommender module 210 may identify the customer of the call, search for customer service tickets associated with the identified customer, and when recommender module 202 does not locate any customer service tickets associated with the identified customer, generate a new customer service ticket for the customer.

At activity 606, recommender module 210 checks for one or more topics for the customer service ticket. When recommender module 210 cannot determine at least one topic of a plurality topics for the customer service ticket, method 600 continues to activity 608 where recommender module 210 does not recommend a knowledge resource to a customer service representative of one or more service centers 140, and method 600 ends. Continuing with the previous example, when recommender module 210 is not able to identify the topic of the customer service ticket for the password reset, such as, for example, when no topic has been assigned by a customer of one or more customer systems 130 or a customer service representative of one or more service centers 140 and recommender module 210 is unable to determine the topic is a "password reset—email" topic, recommender module 210 does not recommend a knowledge resource, and method 600 ends.

However, when recommender module 210 determines at least one topic of the plurality of topics for the customer service ticket, method 600 continues to activity 610, where recommender module 210 checks for a subject of the customer service ticket. Continuing with the example of the customer service ticket associated with a customer's problem resetting a password for the web-based email, when recommender module 210 identifies the topic of the customer service ticket is a "password reset—email" topic, such as, for example, when a customer of one or more customer systems 130 or a customer service representative of one or more service centers 140 has assigned the topic with the customer service ticket, or when recommender module 210 uses natural language processing to identify the topic is a "password reset—email" topic, recommender module 210 continues to activity 610, where recommender module 210 checks for a subject of the customer service ticket.

When recommender module 210 does not determine the subject of the customer service ticket at activity 610, method 600 continues to activity 612, where recommender module 210 calculates a distance metric between at least one topic of the customer service ticket and a top-ranked knowledge resource having the same topic of the customer service ticket, and method 600 continues to activity 616. According to embodiments, recommender module 210 calculates the topic distance metric based, at least in part, on one or more of the following: the top-ranked knowledge resource for the identified topic and the customer service ticket are not created, edited, or associated with the same customer service representative; the top-ranked knowledge resource for the identified topic and the customer service ticket are associated with the same topic and/or subject; the customer service ticket and the top-ranked knowledge resource have the same priority; and the customer service ticket and a top-ranked knowledge resource for the same topic are the most textually simila.

However, when recommender module 210 determines the subject of the customer service ticket at activity 610, method 600 continues to activity 614, where recommender module 210 calculates a distance metric between the subject of the customer service ticket and a top ranked knowledge resource having the same subject as the customer service ticket. Similarly to the topic distance metric described above, recommender module 210 may calculate the subject distance metric based, at least in part, on one or more of the following: the top-ranked knowledge resource for the identified subject and the customer service ticket are not created, edited, or associated with the same customer service representative; the top-ranked knowledge resource for the identified subject and the customer service ticket are associated with the same topic and/or subject; the customer service ticket and the top-ranked knowledge resource have the same priority; and the customer service ticket and a top-ranked knowledge resource for the same subject are the most textually similar.

By way of explanation and not by way of limitation, an example of calculating a distance metric is provided in connection with the previously described example of the customer service ticket associated with the "password reset—email" topic. When recommender module 210 does not identify a subject of the customer service ticket, recommender module 210 calculates the distance metrics between the customer service ticket and one or more of the top-ranked knowledge resources associated with the "password reset—email" topic. However, when recommender module 210 identifies a subject of the customer service ticket, recommender module 210 calculates the distance metrics between the customer service ticket one or more of the top-ranked knowledge resources associated with the "password reset—email" topic and the distance metrics between the customer service ticket and one or more of the top-ranked knowledge resources associated with the identified subject, such as, for example, a subject identifying the issue comprises a password reset for a locked or restricted account (such as, for example, when a user has attempted too many login attempts with an incorrect password).

At activity 616, graphical user interface module 212 displays by a graphical user interface a recommendation of the top-ranked knowledge resource having the lowest calculated distance metric. According to embodiments, graphical user interface module 212 displays the top-ranked knowledge resource for display on communication device 148 of the customer service representative associated with the customer service ticket. For example, the displayed top-ranked knowledge resource may comprise, for example, a wiki or troubleshooting guide to resolve the issue associated with the customer service ticket, such as, for example, the password reset for the locked or restricted account in the above-described exemplary customer service ticket. At activity 618, recommender module 210 provides a connection between a customer service representative working on the customer service ticket and the customer service representative of the recommended top ranked knowledge resource. The connection may comprise, for example: a telephone number, an email address, and/or a live chat dialog box to communicate with the customer service representative associated with the recommended top-ranked knowledge resource. After activity 618 is complete, the method 600 ends.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for managing service centers comprising a server communicatively coupled to a customer system and a service center over a network, the server further comprising:
   a computer coupled with a database and comprising a processor and memory, the computer configured to:
      monitor one or more channels of communication between one or more customers and a service center for one or more communications between at least one customer of the one or more customers and the service center, wherein the one or more communications each correspond with a customer service ticket;
      track factors detailing a resolution of each customer service ticket, wherein the factors are associated with a particular customer service representative (CSR) out of a plurality of customer service representatives (CSRs);
      detect, in response to the monitoring the one or more communication channels, a communication between a customer and the service center;
      retrieve, in response to the detecting, a plurality of customer factors characterizing the customer;
      score each customer service representative (CSR) based on a corresponding weight applied to each of the tracked factors and each of a plurality of other factors associated with each customer service representative (CSR) to generate a single customer service representative (CSR) score;
      receive a manual adjustment of the single customer service representative (CSR) score;
      identify a customer service representative (CSR) out of the plurality of customer service representatives (CSRs) whose score indicates a best match with the customer;
      assign the customer to the customer service representative (CSR) based on the identifying;
      route the communication from the customer to a communication device associated with the assigned customer service representative (CSR) at the service center;
      monitor an accuracy of the matching between the customer service representative (CSR) and the customer; and
      in response to the monitored accuracy not improving over time, adjust one or more of the corresponding weights applied to each of the tracked factors to improve the matching between the customer service representative (CSR) and the customer.

2. The system of claim 1, wherein the computer is further configured to:

score the plurality of customer service representatives (CSRs) based on the plurality of other factors having a match with corresponding customer factors.

3. The system of claim 1, wherein one or more tracked performance metrics further comprise: a customer ticket completion speed and a proportion of reopened customer tickets.

4. The system of claim 2, wherein the plurality of other factors further comprise at least one category selected from the group consisting of:
an age group, a gender and an educational level.

5. The system of claim 1, wherein the scoring each customer service representative (CSR) further comprises:
generate a composite score based on summing the weighted tracked factors and the weighted other factors.

6. The system of claim 1, wherein the computer is further configured to:
update the tracked factors based on results of a survey received from the customer.

7. A computer-implemented method for managing service centers comprising:
monitoring one or more channels of communication between one or more customers and a service center for one or more communications between at least one customer of the one or more customers and the service center, wherein the one or more communications each correspond with a customer service ticket;
tracking factors detailing a resolution of each customer service ticket, wherein the factors are associated with a particular customer service representative (CSR) out of a plurality of customer service representatives (CSRs);
detecting, in response to the monitoring the one or more communication channels, a communication between a customer and the service center;
retrieving, in response to the detecting, a plurality of customer factors characterizing the customer;
scoring each customer service representative (CSR) based on a corresponding weight applied to each of the tracked factors and each of a plurality of other factors associated with each customer service representative (CSR) to generate a single customer service representative (CSR) score;
receiving a manual adjustment of the single customer service representative (CSR) score;
identifying a customer service representative (CSR) out of the plurality of customer service representatives (CSRs) whose score indicates a best match with the customer;
assigning the customer to the customer service representative (CSR) based on the identifying;
routing the communication from the customer to a communication device associated with the assigned customer service representative (CSR) at the service center;
monitoring an accuracy of the matching between the customer service representative (CSR) and the customer; and
in response to the monitored accuracy not improving over time, adjusting one or more of the corresponding weights applied to each of the tracked factors to improve the matching between the customer service representative (CSR) and the customer.

8. The method of claim 7, wherein the method further comprises:
scoring the plurality of customer service representatives (CSRs) based on the plurality of other factors having a match with corresponding customer factors.

9. The method of claim 7, wherein one or more tracked performance metrics further comprise: a customer ticket completion speed and a proportion of reopened customer tickets.

10. The method of claim 8, wherein the plurality of other factors further comprise at least one category selected from the group consisting of:
an age group, a gender and an educational level.

11. The method of claim 7, wherein the scoring each customer service representative (CSR) further comprises:
generating a composite score based on summing the weighted tracked factors and the weighted other factors.

12. The method of claim 7, wherein the method further comprises:
update the tracked factors based on results of a survey received from the customer.

13. A non-transitory computer-readable medium embodied with software for managing service centers, the software when executed using one or more computer systems is programmed to:
monitor one or more channels of communication between one or more customers and a service center for one or more communications between at least one customer of the one or more customers and the service center, wherein the one or more communications each correspond with a customer service ticket;
track factors detailing a resolution of each customer service ticket, wherein the factors are associated with a particular customer service representative (CSR) out of a plurality of customer service representatives (CSRs);
detect, in response to the monitoring the one or more communication channels, a communication between a customer and the service center;
retrieve, in response to the detecting, a plurality of customer factors characterizing the customer;
score each customer service representative (CSR) based on a corresponding weight applied to each of the tracked factors and each of a plurality of other factors associated with each customer service representative (CSR) to generate a single customer service representative (CSR) score;
receive a manual adjustment of the single customer service representative (CSR) score;
identify a customer service representative (CSR) out of the plurality of customer service representatives (CSRs) whose score indicates a best match with the customer;
assign the customer to the customer service representative (CSR) based on the identifying;
route the communication from the customer to a communication device associated with the assigned customer service representative (CSR) at the service center;
monitor an accuracy of the matching between the customer service representative (CSR) and the customer; and
in response to the monitored accuracy not improving over time, adjust one or more of the corresponding weights applied to each of the tracked factors to improve the matching between the customer service representative (CSR) and the customer.

14. The non-transitory computer-readable medium of claim 13, wherein the software is further programmed to:

score the plurality of customer service representatives (CSRs) based on the plurality of other factors having a match with corresponding customer factors.

15. The non-transitory computer-readable medium of claim 13, wherein one or more tracked performance metrics further comprise: a customer ticket completion speed and a proportion of reopened customer tickets.

16. The non-transitory computer-readable medium of claim 14, wherein the plurality of other factors further comprise at least one category selected from the group consisting of:

an age group, a gender and an educational level.

17. The non-transitory computer-readable medium of claim 14, wherein the software is further programmed to:

update the tracked factors based on results of a survey received from the customer.

* * * * *